US010901794B2

(12) United States Patent
Ermler et al.

(10) Patent No.: US 10,901,794 B2
(45) Date of Patent: Jan. 26, 2021

(54) DETERMINING AN EXECUTION TIME OF AN APPLICATION PROGRAM

(71) Applicant: SIEMENS AKTIENGESELLSCHAFT, Munich (DE)

(72) Inventors: Rene Ermler, Erlangen (DE); Cornelia Krebs, Rückersdorf (DE); Jörg Neidig, Nuremberg (DE); Gustavo Arturo Quiros Araya, Princeton, NJ (US)

(73) Assignee: SIEMENS AKTIENGESELLSCHAFT, München (DE)

(*) Notice: Subject to any disclaimer, the term of this patent is extended or adjusted under 35 U.S.C. 154(b) by 0 days.

(21) Appl. No.: 16/322,200

(22) PCT Filed: Jun. 12, 2017

(86) PCT No.: PCT/EP2017/064221
§ 371 (c)(1),
(2) Date: Jan. 31, 2019

(87) PCT Pub. No.: WO2018/024390
PCT Pub. Date: Feb. 8, 2018

(65) Prior Publication Data
US 2019/0163535 A1    May 30, 2019

(30) Foreign Application Priority Data

Aug. 1, 2016   (DE) .................. 10 2016 214 117

(51) Int. Cl.
*G06F 9/50*   (2006.01)
*G06F 11/34*  (2006.01)
(Continued)

(52) U.S. Cl.
CPC .......... *G06F 9/5038* (2013.01); *G05B 17/02* (2013.01); *G05B 19/056* (2013.01); *G06F 9/455* (2013.01);
(Continued)

(58) Field of Classification Search
CPC ...... G06F 9/5038; G06F 9/455; G06F 9/5077; G06F 11/3452; G06F 11/3419; G05B 19/056; G05B 17/02
(Continued)

(56) References Cited

U.S. PATENT DOCUMENTS 6,128,641 A * 10/2000  Fleck .................. G06F 9/30043
                                                      718/108
8,473,638 B2 * 6/2013  Aweya ................... H04L 67/02
                                                      709/248
(Continued)

FOREIGN PATENT DOCUMENTS

CA       2313839 A1   1/2001
CN       1283819 A    2/2001
(Continued)

OTHER PUBLICATIONS

PCT International Search Report dated Aug. 29, 2017 and corresponding to PCT International Application No. PCT/EP2017/064221 filed on Jun. 12, 2017.
(Continued)

*Primary Examiner* — Marina Lee
(74) *Attorney, Agent, or Firm* — Schmeiser, Olsen & Watts LLP

(57) ABSTRACT

Provided is a control unit of an automation system for determining the execution time of a user program, including a first time-determining unit, wherein the first time-determining unit determines the execution time for the control unit and/or another control unit in a first operating mode,
(Continued)

wherein at least one boundary condition is taken into account in the determination of the execution time, and wherein statistical data about the running time of commands of the user program of the control unit or of a linear representation of the real time of the control unit are taken into account in the determination of the execution time. A corresponding method and to a computer program product is also provided.

16 Claims, 1 Drawing Sheet

(51) Int. Cl.
 G05B 19/05 (2006.01)
 G05B 17/02 (2006.01)
 G06F 9/455 (2018.01)
(52) U.S. Cl.
 CPC ........ *G06F 9/5077* (2013.01); *G06F 11/3419* (2013.01); *G06F 11/3452* (2013.01)
(58) Field of Classification Search
 USPC .................................................. 717/124–161
 See application file for complete search history.

(56) References Cited

U.S. PATENT DOCUMENTS

| | | | | |
|---|---|---|---|---|
| 9,015,677 B2* | 4/2015 | Tunik | ...................... | G06F 9/451 717/135 |
| 10,012,979 B2* | 7/2018 | Grgic | ...................... | G05B 19/05 |
| 2005/0120338 A1* | 6/2005 | Grob | ...................... | B25J 9/1656 717/131 |
| 2008/0301409 A1* | 12/2008 | May | ...................... | G06F 9/3867 712/206 |
| 2011/0161716 A1* | 6/2011 | Hyvonen | ............ | G06F 9/45558 713/502 |
| 2011/0173362 A1* | 7/2011 | Kardashov | ............ | G06F 9/5077 710/264 |
| 2012/0198256 A1* | 8/2012 | Neumann | ............ | G05B 19/041 713/322 |
| 2015/0082289 A1* | 3/2015 | Leinfellner | ......... | G06F 11/3688 717/134 |
| 2016/0266563 A1 | 9/2016 | Mizutani et al. | | |
| 2017/0205811 A1* | 7/2017 | Grgic | ............... | G05B 19/41835 |
| 2019/0163535 A1* | 5/2019 | Ermler | ................ | G05B 19/056 |

FOREIGN PATENT DOCUMENTS

| | | |
|---|---|---|
| CN | 1487107 A | 4/2004 |
| CN | 102323786 A | 1/2012 |
| CN | 103257670 A | 8/2013 |
| CN | 205003526 U | 1/2016 |
| CN | 105637433 A | 6/2016 |
| DE | 10349349 A1 | 5/2005 |
| EP | 1936503 A1 | 6/2008 |
| EP | 2482147 A1 | 8/2012 |
| JP | 2001209411 A | 8/2001 |
| WO | WO 2015124170 A1 | 8/2015 |

OTHER PUBLICATIONS

Non-English German Exam Report for application 2016P15225 DE dated Dec. 6, 2016.

Office Action in corresponding Chinese Patent Application No. 201780048299.X dated Nov. 26, 2020. 10 pages.

* cited by examiner

DETERMINING AN EXECUTION TIME OF AN APPLICATION PROGRAM

CROSS-REFERENCE TO RELATED APPLICATIONS

This application claims priority to PCT Application No. PCT/US2017/064221, having a filing date of Jun. 12, 2017, based off of German Application No. 10 2016 214 117.1, having a filing date of Aug. 1, 2016, the entire contents both of which are hereby incorporated by reference.

FIELD OF TECHNOLOGY

The following relates to a control unit of an automation system for determining an execution time of an application program and to a corresponding method and computer program product. The control unit is, in particular, in the technical field of automation technology and Industry 4.0.

BACKGROUND

Such control units are known from the prior art. For example, a control unit may be in the form of a programmable logic controller (PLC) or a field bus coupler. The control unit is usually connected to further system modules in an automation system via a data transmission channel such as a field bus. Furthermore, the control unit can interchange data with the further system modules via the field bus and can control them, for example can switch them on or off, via an application program.

In this case, the control unit is suitable, in particular, for time-critical automation tasks in the industrial environment and is designed for real-time operation. For example, the control unit can use sensors to detect whether the safety between man and machine is at risk. For example, limit values are not complied with. If necessary, the control unit can then switch off the automation system by executing the application program and can therefore change it to a safe state. The control unit needs a certain period to execute the application program or the application, which is referred to as the execution time, runtime or cycle time of the application program below.

In this case, it is necessary for the time requirements of the application program to be complied with. Compliance is usually the responsibility of the user or the automation engineer implementing the automation code or source code of the application program. One difficulty can be seen in the fact that the time for a cycle is not deterministic in the sense that it is neither constant nor can be precalculated.

However, conventional engineering systems provide the user only with auxiliary functions for monitoring the execution time of the application program. These auxiliary functions can be used in a simulation and in the actual controller during activation. In this case, the minimum execution time, the maximum execution time and the average execution time are captured and displayed, for example. The maximum execution time is the longest time which occurs during observation, while the minimum execution time is the shortest time which occurs during observation.

However, the values calculated and displayed in the simulation on a computer do not provide sufficient information with respect to the requirements during use in the real automation system since the PLC hardware (for example processor, memory, runtime environment) can differ significantly from the PC hardware of the simulation environment. In particular, values which are measured during the execution time on a real control unit cannot be directly applied to other hardware variants. Consequently, it is not possible to infer therefrom how the application program will behave on lower-power or more powerful hardware. Furthermore, the measured values are dependent on the situation, that is to say the application program may behave in a highly different manner in terms of time depending on the situation of the automation system.

Furthermore, engineering systems are known from the prior art. The engineering system is a program in which the programmer creates the application program and can find out the state of the controller. However, known engineering systems do not provide any functions for specifically estimating the maximum execution time of the application program. Furthermore, the engineering systems do not adequately ensure that the corresponding time limits are complied with.

The estimation of the execution time and the compliance with the limits are important, for example, when selecting the correct control hardware. The user can choose between a powerful or a low-power control unit. The choice can be made, in particular, on the basis of the estimation of a control unit. Control units which are sufficiently powerful but do not have too many unused power reserves are preferably selected, for example.

The present embodiments of the invention are therefore based on the object of providing a control unit of an automation system, which control unit can efficiently estimate the execution time of an application program for any desired control unit.

SUMMARY

An aspect relates to a control unit of an automation system for determining an execution time of an application program, having:
a first time determination unit,
wherein the first time determination unit determines the execution time for the control unit and/or another control unit in a first operating mode,
wherein the determination of the execution time takes into account at least one boundary condition, and
wherein the determination of the execution time takes into account statistical data relating to the runtime of instructions of the application program of the control unit or a linear representation of the real time of the control unit.

Accordingly, the embodiments of the invention are directed to a control unit of an automation system, in particular a programmable logic controller (PLC). Alternatively, another control unit can also be used. As already stated further above, the control unit usually executes an application program. The application program is also conventionally referred to as a main program and has a sequence of instructions or commands for different or identical functions, for example control instructions for controlling industrial or automation systems. In the case of a PLC, the application program accordingly has PLC instructions.

The period needed by the application program for execution is referred to as the execution time or runtime, as already defined further above. The execution time is composed of the periods of the individual instructions. The execution time may be longer or shorter depending on the number, scope or duration of the instructions etc. In contrast to the execution time, the system time is a changing time during the execution of the application program.

The execution time is determined by the first time determination unit. The program can be executed once or a number of times. In the first case, the execution time is determined for precisely the one execution by adding up the time requirement of all individual instructions. In the second case in which the program is called very often, different situations need to be considered and different parts of the program are executed. Therefore, the minimum execution time, average execution time or maximum execution time can be statistically considered here.

Time limits can be monitored by determining the execution time. In the above example, in the case of determining the maximum execution time, it is possible to estimate how long the application program will run for in the worst case. In other words, the execution time is a fictitious time and the worst possible time is assumed for each instruction. It is therefore possible to estimate how long the application program will need at most in this situation.

On the one hand, the execution time can be determined for the current control unit using the integrated time determination unit.

Accordingly, it is possible to determine, for example, the maximum execution time of an available control unit using the integrated time determination unit. In other words, the integrated time determination unit can be used to estimate how the available control unit will behave during operation and how long it will need in the worst case to successfully conclude the application program. As a result, the worst-case performance of the control unit can be estimated and it is also possible to determine whether or not the available control unit suffices to meet particular requirements. Consequently, it is thus possible to determine whether the current control unit should be replaced or whether another decision should be made.

For example, the available control unit has a lower power than a more powerful control unit etc. and it is doubtful whether the lower-power control unit meets the desired requirements. Alternatively, any other features of the control unit can be used as the basis for a decision.

On the other hand, the execution time can be alternatively or additionally determined for another control unit irrespective of whether this other control unit has a time determination unit. Consequently, the execution time or other statistical data relating to an available control unit can be determined with the integrated time determination unit, for example, and can be used as a basis for determining the execution time of another control unit.

In the case of a PLC of an automation system, the execution time of the PLC instructions of the application program of the PLC or of another PLC is determined in an efficient and accurate manner. As a result, the control of the automation system by the PLC can likewise be better monitored.

In this case, the execution time is determined for the control unit or for the other control unit while complying with at least one boundary condition and in a first operating mode. The compliance with the one or more boundary conditions ensures, with respect to the execution time, an error-free and efficient run of the application program on the control unit and of the determination. The application program can be advantageously executed without interruption.

In one configuration, the first time determination unit is a virtual clock. Accordingly, the virtual clock is completely integrated in the control unit and is therefore a permanent part of the control unit. The time of the virtual clock preferably progresses independently of a real clock and therefore does not determine a real time.

In another configuration, the at least one boundary condition is a system condition, a memory assignment, a network load or a hardware resource. Accordingly, the boundary condition is a requirement or limit of the hardware or software of the control unit or of the other control unit, of the application program of the control unit or of the other control unit or of the superordinate engineering system which can comprise the control unit or the other control unit and/or further system components. The compliance enables a smooth and efficient run of the programs on the control unit or the other control unit and, in particular, of the determination of the execution time of the application program for the control unit or the other control unit. As a result, errors are intercepted from the outset and complicated, time-consuming and complex subsequent error handling measures are accordingly avoided.

In another configuration, the first time determination unit can change from the first operating mode to a second operating mode, in particular by means of a switch. Accordingly, the first time determination unit can change over from the first operating mode to a second operating mode. The changeover can be effected, for example, by means of software which is executed by the control unit or the other control unit, for example the system software. Therefore, the changeover is not a function of the application program.

In another configuration, the first time determination unit also influences the application program of the control unit or of the other control unit, in particular taking into account the determined execution time. Accordingly, the first time determination unit determines the execution time of the application program for the control unit or the other control unit in one step. This execution time is processed further by the first time determination unit in a further step. For example, the first time determination unit can influence the system time relative to the real time and can decelerate or accelerate it, for example, in the further step. As a result, a deceleration or acceleration of the execution is advantageously simulated since more or less system time is needed to execute the application program. In other words, dynamic feedback is effected in real time between the time determination unit and the application program.

In another configuration, the first time determination unit determines the execution time independently of a real time and/or during the execution of the application program on the control unit. Accordingly, the first time determination unit, in particular the virtual clock, determines the execution time of the application program for the control unit or the other control unit independently of a real clock and its real time. Alternatively or additionally, the first time determination unit carries out this determination during the execution of the application program on the control unit. Therefore, both the determination and the execution of the application program are carried out in a parallel manner. The control unit can be advantageously hereby operated without interruption and there is no time loss during operation or delayed execution times of individual programs.

In another configuration, the first operating mode is a time determination mode and/or the second operating mode is a normal mode. Accordingly, the above determination of the execution time is carried out in a time determination mode and the time determination unit is active. In contrast, the above determination of the execution time is not carried out in a normal mode and the time determination unit is therefore inactive. As a result, the normal operation is advantageously not disrupted. Furthermore, other modes are also conceivable.

In another configuration, the control unit also has a second time determination unit, in particular a real-time clock.

In another configuration, the second time determination unit determines the system time in a second operating mode and the second time determination unit can change from the second operating mode to the first operating mode.

Accordingly, in addition to a first time determination unit, the control unit has a second time determination unit. The second time determination unit is a real-time clock or real clock for capturing the system time. In the normal mode, the system time corresponds to the real time and the real-time clock is active. In contrast, the system time can deviate from the real time in the time determination mode. It is possible to arbitrarily change between the two operating modes in a bidirectional manner.

In another configuration, the determined execution time is processed further. Accordingly, the result of the determination, the execution time, can be processed further. For example, an actual/desired comparison can be carried out. The execution time can accordingly be compared with a desired value (predetermined limit value). The determined execution time of a low-power control unit can be compared with a limit value, for example a maximum execution time here. If the maximum execution time is exceeded, a decision can be made. In this case, the decision can be made to replace the low-power control unit with a more powerful control unit in order to minimize the execution time. In other words, it is possible to check whether the current control unit should be replaced with a more powerful, lower-power, more favorable, etc. control unit on the basis of the determined execution time. In addition or as an alternative to the actual/desired comparison, other algorithms or method steps can be used.

The embodiments of the invention also relate to a method for determining an execution time of an application program.

The embodiments of the invention also relate to a computer program product, (non-transitory computer readable storage medium having instructions, which when executed by a processor, perform actions,) having a computer program which has means for carrying out the method described above when the computer program is executed on a program-controlled device.

A computer program product, for example a computer program means, can be provided or delivered, for example, as a storage medium, for example a memory card, a USB stick, a CD-ROM, a DVD, or else in the form of a downloadable file from a server in a network. This can be effected, for example in a wireless communication network, by transmitting a corresponding file containing the computer program product or the computer program means. A control device, for example an industrial control PC or a programmable logic controller, PLC for short, or a microprocessor for a smartcard or the like is possible, in particular, as a program-controlled device.

BRIEF DESCRIPTION

Some of the embodiments will be described in detail, with reference to the following figures, wherein like designations denote like members, wherein.

DETAILED DESCRIPTION

Preferred embodiments of the present invention are described below with reference to the accompanying figures.

Figure 1A:
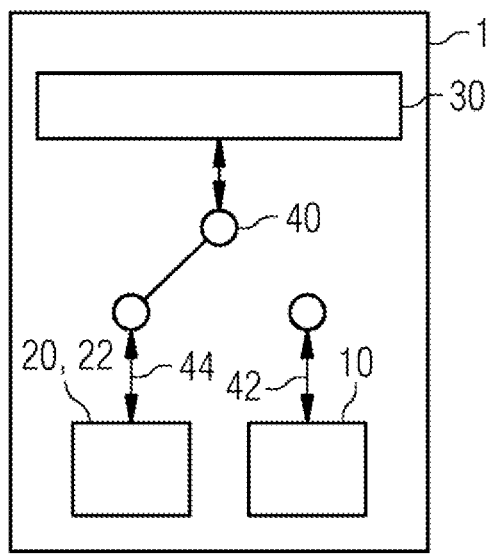
FIG. 1a shows a control unit according to embodiments of the invention of an automation system for determining an execution time of an application program in the normal mode.
Figure 1B:
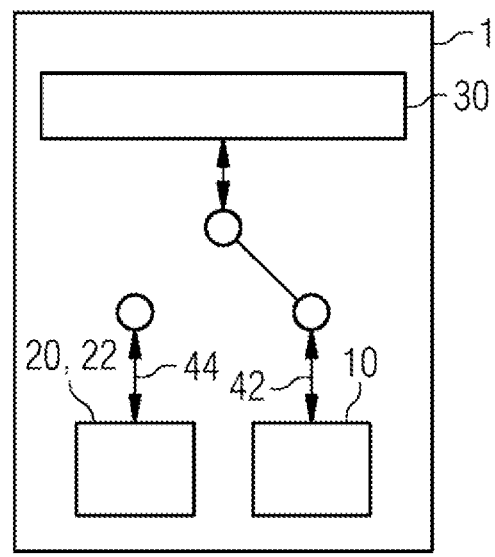
FIG. 1b shows a control unit according to embodiments of the invention of an automation system for determining an execution time of an application program in the time determination mode.
Figure 2A:
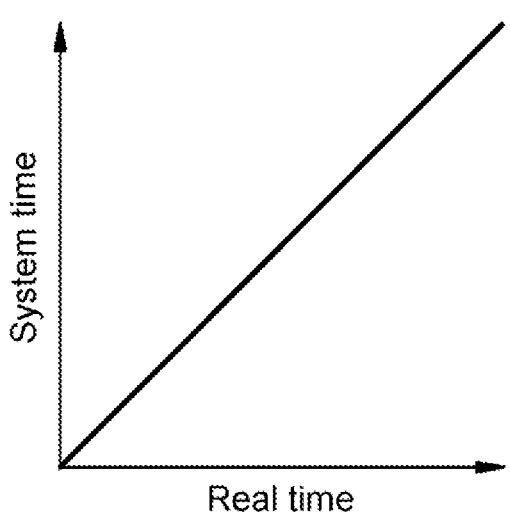
FIG. 2a shows a time diagram in the normal mode according to an embodiment of the invention.
Figure 2B:
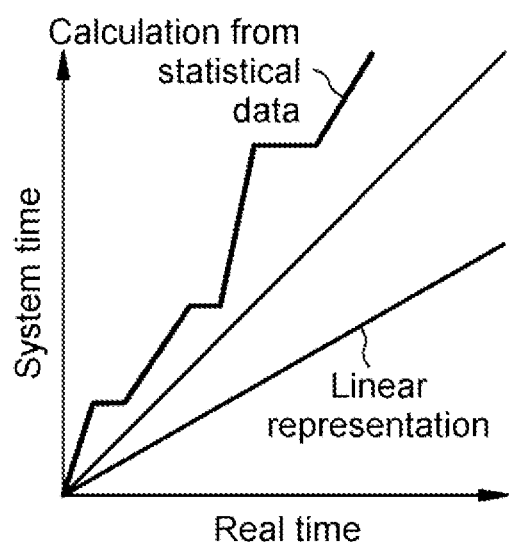
FIG. 2b shows a time diagram in the time determination mode according to an embodiment of the invention.

FIG. 1 shows a control unit 1 for determining an execution time of an application program according to the embodiments of the invention. As illustrated, a first time determination unit 10 is integrated, as a component, in the control unit 1. The first time determination unit 10 is a virtual clock, for example. Furthermore, a real-time clock is integrated, as a second time determination unit 20, in the control unit 1. The time of the virtual clock 10 can progress independently of the real time.

Furthermore, the control unit 1 executes an application program 30, and the execution duration or execution time is the period required by the application program 30 for execution. This execution time and therefore the noticeable execution speed of the application program 30 can be captured using the virtual clock 10. For this purpose, it is determined, for each instruction of the application program which is currently being executed, how long its execution time is in the desired application, for example the average time, a linearly scaled value, a worst-case value or the statistical execution time of this instruction on another controller. The determined time is added to the value of the virtual clock. The execution time can be determined at the virtual clock after the program run (cycle) has been concluded.

Like in a conventional control unit 1, the application program 30 is executed relative to the system time of the control unit 1. This time can be used to capture time stamps and to trigger time-controlled events. The control unit 1 can be executed in two different modes or operating modes, namely a first operating mode 42, the normal mode, and a second operating mode 44, the time determination mode. The control unit 1 can change back and forth or change over between these two operating modes 42, 44 in any desired manner by means of a switch 40. In this case, the switch may be software.

In the normal mode 44, the real-time clock 20 of the control unit 1 determines the system time. The system time therefore corresponds to the real time 22. The normal mode 44 corresponds to the normal execution mechanism in a conventional control unit 1.

In the time determination mode 42, the virtual clock 10 can replace the real-time clock 20 in the control unit 1 and can determine the system time for the control unit 1 (illustrated) and/or for another control unit (not illustrated). In other words, the determination according to the embodiments of the invention are carried out in the time determination mode 42. In this case, the system time can therefore deviate from the real time 22. Consequently, the application program 30 no longer runs "as quickly as possible" in real time, but rather progresses more quickly or more slowly on the basis of the virtual clock 10. The application program 30 can therefore nevertheless run at the same speed relative to the real time 22 since only the progression of the system time is changed.

For example, the virtual clock 10 can carry out the following functions in order to determine the execution time for the control unit 1 having the virtual clock 10 (illustrated) or another control unit (not illustrated). The control unit 1 is also referred to as the first control unit and the other control unit is referred to as the second control unit for the simplified description of the following method of operation.

In one embodiment, the maximum execution time can be simulated using statistical runtime data. The virtual clock can determine the execution time on the basis of previously collected statistical data relating to the runtime of instructions for the current type of control unit. In this case, the runtimes for the individual executed instructions are artificially extended in accordance with their maximum duration, and the system time is accelerated relative to the real time in this case. A deceleration of the execution is therefore effectively simulated since more system time is needed to execute the program. The resulting runtime corresponds to an estimation of the "worst-case performance" for the current control unit.

In one embodiment, the maximum execution time can be simulated in a second control unit using statistical runtime data. Statistical data relating to the runtime of PLC instructions of the first control unit are first of all collected. The virtual clock can then determine the execution time for a second control unit for the individual PLC instructions of the first control unit in accordance with their maximum duration of the execution time on the basis of these statistical data. The system time is therefore effectively accelerated, for example for a slower PLC, or decelerated, for example for a faster control unit, according to the performance of the second control unit. The resulting runtime then corresponds to the behavior of the second control unit.

In one embodiment, the performance of a second PLC can be simulated using a relative performance factor. Accordingly, the virtual clock can determine the system time as a linear representation of the real time, for example for a second control unit and on the basis of a corresponding performance factor relative to the first control unit. The gradient is the reciprocal of the relative performance factor, for example. A linear acceleration of the system time, for example for a slower control unit, or a linear deceleration of the system time, for example for a faster control unit, relative to the real time is therefore produced. The variation in the system time has an effect on the execution of the application program. For example, time-controlled functions are activated more often (or more rarely) in the case of an accelerated (or decelerated) system time with respect to the real time, and this will result in more frequent (or rarer) interruptions in background processes—a simulation of the execution in a lower-power (or more powerful) control unit according to the relative performance factor. The relative performance factor therefore reflects the expectation that an apparatus with a clock rate which is 50% higher is, for example, 25% faster or a device with an eight-core processor is twice as fast as an apparatus having a dual-core processor.

In another embodiment of the invention, the integrated virtual clock can determine the execution time for the first and/or the second control unit in parallel with the execution of the application program. Alternatively, the execution of the application program can also be interrupted, for example for a particular period, in order to perform another function or to change over to a quiescent state and therefore a third operating mode. The third state is also referred to as the freeze mode and is used to examine the state and the error detection etc.

The determination of the linear representation is advantageously associated with very little computer effort and does not influence the total execution duration at all or influences it insignificantly. In contrast, the time determination from previously collected statistical data can result in longer execution times. However, the time values for the system time are advantageously determined only from known data in this case. Therefore, there is no need for any complicated and time-consuming measurement. A corresponding function can be arbitrarily selected by weighing up the respective advantages and disadvantages and the respective intended application. In this case, the corresponding calculation of the system time is independent of the actual duration of the application program during the determination, and the execution time required for this purpose does not influence the results.

In another embodiment of the invention, it is possible to simulate how the application program 30 would behave on a lower-power or more powerful control unit 1 by decelerating and accelerating the virtual time with respect to the real time. Since time-dependent tasks (timers, wake-up alarms, etc.) can be started on the basis of the virtual time and the program execution can progress without change, the effect of a slower or a faster processor can be tested. The test answers the question of whether the cycle time is violated or whether the concurrent processes can be executed quickly enough.

In another embodiment of the invention, the determined execution times can be evaluated further. The further evaluation can be carried out by the control unit or by the engineering system. For this purpose, the controller provides the possibilities of setting the individual parameters of the execution time determination and requesting the results (execution times) in an automated manner. The values obtained can then be used to carry out further statistical calculations (average values, minimum and maximum values, standard deviations, long-term curves, etc.). For this purpose, the engineering system itself may provide functionalities or software or another application can be used. For example, the meeting of time requirements of the application program can be monitored in the engineering system according to planned time configurations for the application program.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A hardware controller of an automation system configured to execute an application program, the controller determining an execution time of the application program, the controller comprising:
   a first time determination unit, wherein the first time determination unit determines the execution time for the controller and/or another controller, in a first operating mode;
      wherein a determination of the execution time takes into account at least one boundary condition; and
      wherein the determination of the execution time takes into account statistical data relating to runtime of instructions of the application program or a linear representation of a real time of the controller a second time determination unit, wherein the second time determination unit determines a system time of the controller, in a second operating mode;

wherein, when the controller switches from the second operating mode to the first operating mode, the first time determination unit replaces a function of the second time determination unit and determines the system time instead of the second time determination unit;

wherein the first time determination unit progresses independently of the second time determination unit.

2. The hardware controller as claimed in claim 1, wherein the first time determination unit is a virtual clock.

3. The hardware controller as claimed in claim 1, wherein the at least one boundary condition is a system condition, a memory assignment, a network load or a hardware resource.

4. The hardware controller as claimed in claim 1, wherein the first time determination unit switches from the first operating mode to the second operating mode by means of a switch.

5. The hardware controller as claimed in claim 1, wherein the first time determination unit also influences the application program of the controller or of the other controller, taking into account the determined execution time.

6. The hardware controller as claimed in claim 1, wherein the first time determination unit determines the execution time independently of the real time and/or during the execution of the application program on the controller.

7. The hardware controller as claimed in claim 1, wherein the first operating mode is a time determination mode and/or the second operating mode is a normal mode.

8. The hardware controller as claimed in claim 1, wherein the second time determination unit is a real-time clock.

9. The hardware as claimed in claim 1, wherein the determined execution time is processed further.

10. The hardware controller as claimed in claim 1, wherein the controller is an industrial controller.

11. The hardware controller as claimed in claim 1, wherein the controller is a programmable logic controller (PLC).

12. A method for determining an execution time of an application program, the method comprising:

determining the execution time in a first operating mode for a control unit or another control unit by means of the control unit that is configured to execute the application program;

wherein the determining the execution time takes into account at least one boundary condition; and wherein the determining takes into account statistical data relating to runtime of instructions of the application program of the control unit or a linear representation of areal time of the control unit;

wherein, when the controller switches from the second operating mode to the first operating mode, the first time determination unit replaces a function of the second time determination unit and determines the system time instead of the second time determination unit;

wherein the first time determination unit progresses independently of the second time determination unit.

13. The method as claimed in claim 12, wherein the first time determination unit is a virtual clock.

14. The method as claimed in claim 12, wherein the at least one boundary condition is a system condition, a memory assignment, a network load or a hardware resource.

15. The method as claimed in claim 12, wherein the first time determination unit switches from the first operating mode to the second operating mode by means of a switch.

16. A computer program product, comprising a non-transitory computer readable hardware storage device having computer readable program code stored therein, said program code executable by a processor of a computer system to implement a method, as claimed in claim 12 when the computer program is executed on a program-controlled device.

* * * * *